F. GRUMME.
SANITARY DRINKING FOUNTAIN.
APPLICATION FILED OCT. 9, 1911. RENEWED JAN. 29, 1914.

1,109,219.

Patented Sept. 1, 1914.

2 SHEETS—SHEET 1.

WITNESSES
R. C. Fryar
R. G. Randle

Frederick Grumme,
INVENTOR;
By Robert W. Caudle,
ATTORNEY.

F. GRUMME.
SANITARY DRINKING FOUNTAIN.
APPLICATION FILED OCT. 9, 1911. RENEWED JAN. 29, 1914.

1,109,219.

Patented Sept. 1, 1914.

2 SHEETS—SHEET 2.

WITNESSES
R. E. Fryar
R. E. Randt

Frederick Grumme,
INVENTOR;
Robert W. Kavdle,
ATTORNEY.

UNITED STATES PATENT OFFICE.

FREDERICK GRUMME, OF INDIANAPOLIS, INDIANA.

SANITARY DRINKING-FOUNTAIN.

1,109,219.          Specification of Letters Patent.      Patented Sept. 1, 1914.

Application filed October 9, 1911, Serial No. 653,541.   Renewed January 29, 1914.   Serial No. 815,288.

*To all whom it may concern:*

Be it known that I, FREDERICK GRUMME, a citizen of the United States, residing in the city of Indianapolis, in the county of Marion and State of Indiana, have invented certain new and useful Improvements in Sanitary Drinking-Fountains, of which the following is a full, clear, and comprehensive specification and exposition, being such as will enable others to make and use the same with absolute exactitude.

The object of my present invention, broadly speaking, is to provide a sanitary drinking fountain which is especially adapted for use in public places, which will be strong and durable in construction and not liable to become inoperative through use, abuse, or disuse, which will be neat and attractive in appearance, easily placed in position, whose operation will be easily understood, which will be easily operated and controlled, and which can be manufactured and sold at a comparatively low price.

A more particular object of this invention is to provide a construction whereby the water will form a solid column in such manner that a drink may be conveniently taken by a person without the use of a cup or other utensil and without personal contact with any part of the fountain except by one's hand, which latter is merely to operate the valve to release the flow of water and even that may be dispensed with if previously arranged for. And finally a further and more specific object is to provide a sanitary Artesian-like drinking fountain adapted to conserve the use of the water supply by automatically cutting off the water when the fountain is not in use, and means whereby the flow of water may be resumed when desired.

Other objects and particular advantages of my invention will be brought out in the course of the following specification, and that which is new will be correlated in the appended claims.

One manner for the carrying out of my invention in a practical way, and that which in practice I have determined to be the most practical, is shown in the accompanying two-sheets of drawings, in which—

Figure 1:
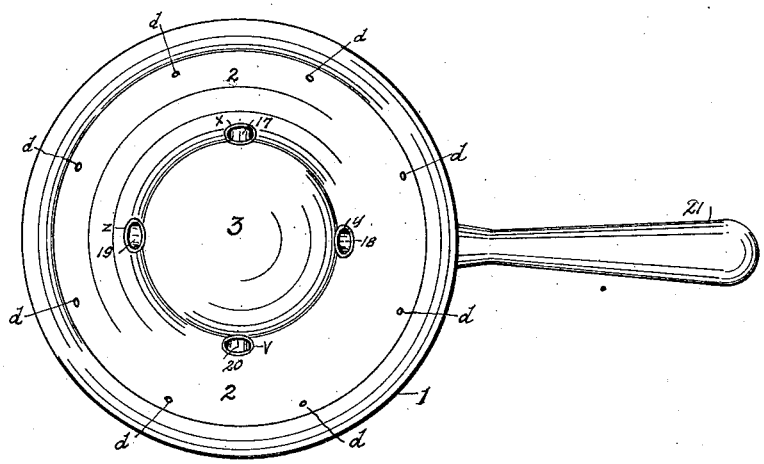
Figure 2:
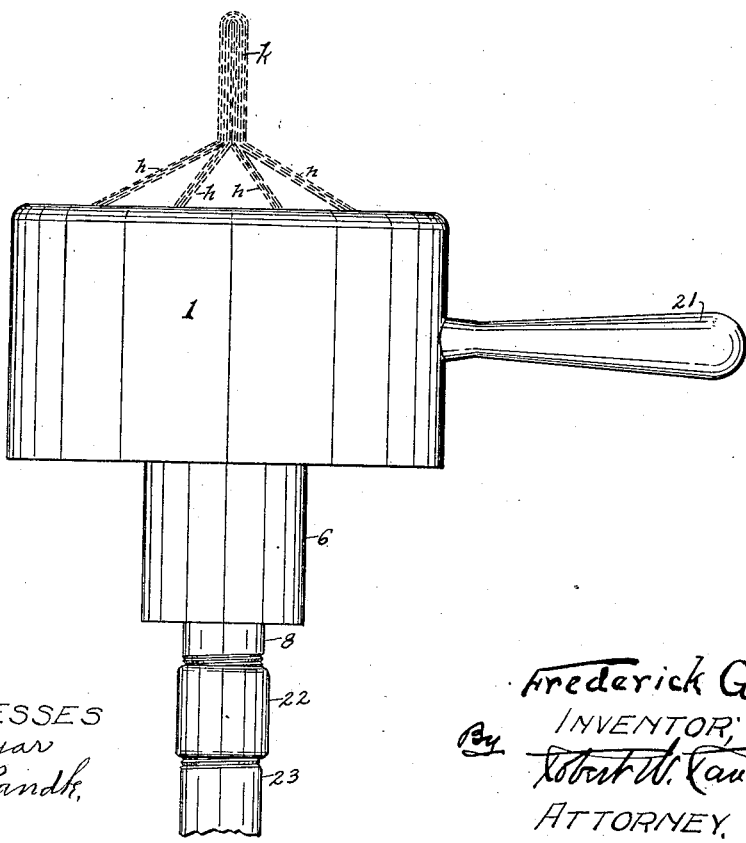
Figure 3:
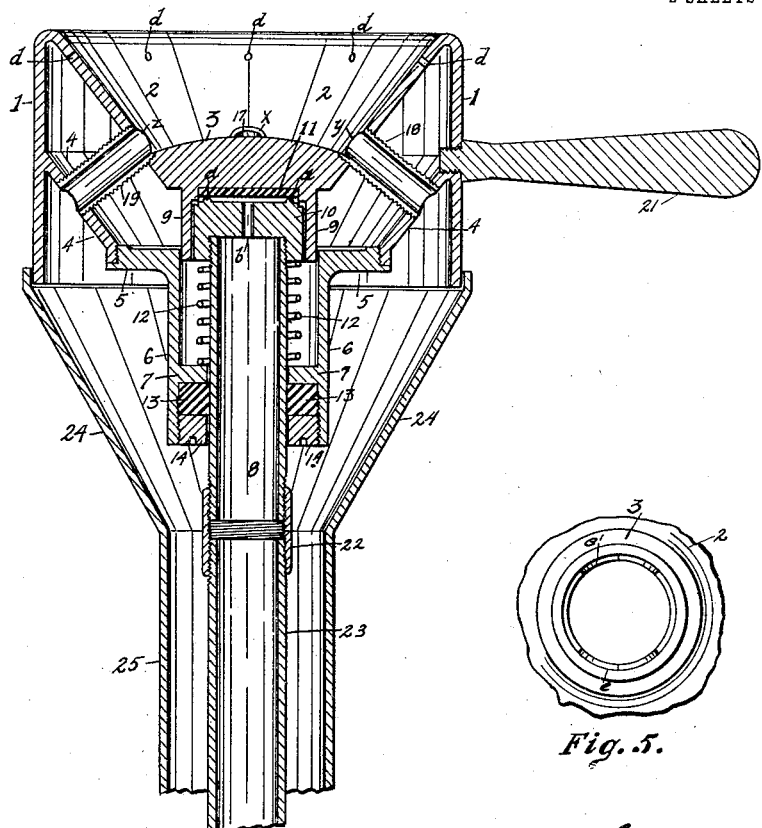
Figure 5:
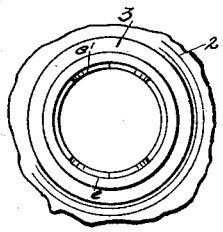
Figure 4:
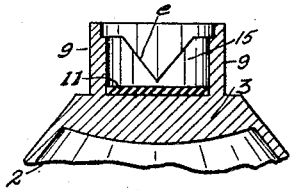
Figure 7:
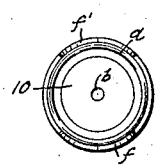
Figure 6:
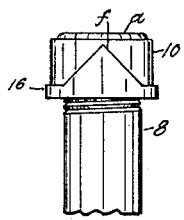

Figure 1 is a plan view of the fountain ready for operation. Fig. 2 is a side elevation of the fountain showing same as in operation. Fig. 3 is a vertical section of the fountain as taken centrally therethrough. Fig. 4 is a detail view showing a central section of the central portion of the device, particularly showing one portion of the valve, the parts shown in this view being inverted. Fig. 5 is a plan view looking down onto, and into, the parts shown in Fig. 4. Fig. 6 is a side elevation of the valve head. And Fig. 7 is a plan view of the upper face of the valve head.

Similar indices denote like parts throughout the several views of the drawings.

In order that the construction and the operation of my invention may be more clearly comprehended I will now take up a detail description thereof in which I will set forth the invention as fully and as briefly as I may.

The body of the invention comprises a casing 1, which forms a circular vertical wall. Formed integral with the upper portion of the wall 1 and extending downwardly and convergently inside the wall 1, is the bowl 2, which has a bottom 3 integral therewith. The upper surface of the bottom 3 is formed convex, but the under face thereof is formed perfectly flat. At the point of union between the bowl and its bottom there is provided a plurality of comparatively large exhaust apertures, as for instance those denoted by the letters *x*, *y*, *z* and *v*, which are formed through the wall of the bowl and they are partly in the bottom thereof.

Extending centerward from about the center (vertically) of the casing 1 is a partition 4, which extends downward and centerward at an angle, leaving a large mouth centrally therethrough whose edge is interiorly threaded to receive the disk 5 which is adapted to be secured therein as shown. The disk 5 has a large central aperture therethrough, from around which extends down the comparatively large tube 6 which is integral with the disk 5. Formed around on the inside of the tube 6, below the center thereof, is the rib 7, below which the interior of the tube is threaded, for the purposes stated.

Numeral 8 denotes a nipple which is adapted to freely pass through the rib 7, both ends of said nipple being threaded.

Extending down from the underside of the bottom 3 is the circular flange 9 whose lower end is adapted to loosely enter the said aperture in the disk 5, that is when the disk 5 is in the position shown in Fig. 3.

By the above it is seen that the flange 9, in connection with the bottom 3, form an inverted cup in which may freely operate the head 10, the latter being threaded on the upper end of the nipple 8, substantially as shown.

Located inside the cap formed by the flange 9, and seated against the underside of the bottom 3, is the resilient disk or cushion 11. Formed around on the upper face of the head 10 is a ridge or chime $a$ which is adapted to contact with and press into the disk 11 in order to form a water-tight joint. Extending up centrally through the head 10 is the duct $b$ through which the water supply may pass when the valve is opened.

Numeral 12 denotes a helical spring whose convolutions surround the nipple 8. One end of said spring engages the under edge of the head 10 and the other end thereof engages the rib 7, as indicated. The tension of said spring should be such as to press the head 10 upward with considerable force, causing the ridge $a$ to embed in the disk 11.

Numeral 13 denotes a suitable packing around the nipple 8, below the rib 7, and it is adapted to be compressed by the nut 14 so that there will be formed a water-tight joint around the nipple at that point.

Located around inside the flange 9 is a strip 15 which is permanently secured to the wall of the flange 9, and it has two diametrically opposed notches, $e$ and $e'$, therein, as shown in Fig. 4.

Surrounding the head 10 is a strip 16 which has two diametrically opposite darts, $f$ and $f'$, extending up thereabove, which are of the same size as are the notches $e$ and $e'$, in which they are adapted to fit when the valve is closed.

In each of the apertures $x$, $y$, $z$ and $v$ is secured a conduit which are indicated by the numerals 17, 18, 19 and 20, respectively. The other ends of said conduits pass through and are secured in suitable apertures therefor in the partition 4. The last named apertures correspond with the said apertures $x$, $y$, $z$ and $v$.

Formed around in the upper portion of the bowl 2 are a plurality of small delivery apertures $d$ which are so positioned in the angular sides of the bowl as to direct each a stream of water therethrough, as the streams $h$ for instance, to a common center. When these streams meet with force at the common center then the force with which they meet should be such as to shoot all of the water directly upward forming a geyser-like column $k$.

Numeral 21 denotes the handle by which the body of the fountain may be turned manually a slight distance to open the valve, the valve being arranged to close automatically.

The lower end of the nipple 8 may be connected, by the coupling 22, to the supply pipe 23.

Numeral 24 denotes an arrangement for catching the waste water. This may be a funnel-like structure as shown, which leads the water down into the waste pipe 25.

In practice the arrangement of my invention is very simple, and is substantially as follows: It is of course intended that the nipple 8 be connected to the supply pipe which carries the water under pressure. Normally the spring 12 presses the head 10 up against the disk 11 with force such as to shut off the water, that is, preventing the water from escaping through the duct $b$, at which time the darts $f$—$f'$ are fitting in the notches $e$—$e'$. Now should the handle 21 be pressed slightly to the right or the left from its normal position, it is evident that this movement will cause the edges of the darts $f$—$f'$ to slide upwardly on the edges of notches $e$—$e'$, thereby forcing the cushion 11 upward a slight distance away from disk 11, and against the resiliency of the spring 12. This last movement will, of course, allow water under pressure to pass through the duct $b$, into the space above the head 10, then down around the head into the tube 6. From the tube 6 the water will be forced upward through the disk 5, around the flange 9 into the space above the partition 4, inside the wall 1, and underneath the bowl 2. The only exit for the water from said space is through the apertures $d$. The streams from all of said apertures $d$ will converge in the center as shown in Fig. 2, thereby forming the geyser-like column $k$, above referred to. The water not utilized will fall down into the bowl 2 and then pass through the several conduits into the space below the partition 4, from which latter space it will be conducted to the waste-pipe 25 by the funnel 24.

From the above it is evident that the fountain is automatic in closing, thereby conserving the consumption of water. However if it should be desired to have the fountain operate continuously then one has only to remove the spring 12, the cushion 11, and the handle 21.

By reason of the shape of the bottom 3, and the positions of conduits, it is manifest that no water is allowed to stand in the bowl or cup.

The various features and advantages involved in this construction have been stated as clearly as possible in order that the involved invention, and its advantages may be readily comprehended even by the inexpert.

I desire that it be understood that my invention is not to be limited to the precise details of construction herein set forth, but I desire that it be understood that various changes may be made therein within the limits thereof without departing from the spirit of the invention or sacrificing any of the advantages thereof.

Having now fully shown and described my invention and the best means for its construction to me known at this time, what I claim and desire to secure by Letters Patent of the United States, is—

1. A sanitary drinking fountain including a bowl having a convex bottom, drainage conduits leading from the bottom of the bowl, there being a plurality of inlet apertures formed in the upper portion of the bowl which are adapted to direct streams of water to a central point in such manner that the force of the water will cause it to form a solid column above the meeting point, a valve adapted to automatically shut off the water supply, and means whereby if the fountain be turned horizontally a slight distance the valve will permit the water to be discharged through said apertures in the bowl as set forth, all substantially as described.

2. A sanitary drinking fountain including a bowl having a convex bottom and sloping sides, means for draining the bottom of the bowl, a valve adapted to automatically shut off the water supply, means whereby if the device be turned slightly the valve will be opened permitting the water to be admitted into the fountain and to be discharged through apertures formed in the wall of the bowl in such manner as to cause the several streams to meet in a common center and then be forced upward forming a solid column, all substantially as shown and described and for the purposes set forth.

3. In a sanitary drinking fountain, a stationary supply-pipe, a head having a central vertical aperture therethrough secured on the upper end of the supply pipe, a strip surrounding the head and having a pair of diametrically opposite darts extending upward therefrom, an inverted cup-like member, a strip extending around the inside of said member and having notches therein in which said darts are adapted to fit, a cushion located in the top of said cup-like member with which said head is adapted to engage, a spring adapted to normally retain said cushion in contact with the face of said head, the whole forming a valve for restraining the water under pressure in the supply-pipe but allowing it to be released when said cup-like member is turned horizontally in either direction, as set forth.

4. A sanitary drinking fountain comprising a fixed supply-pipe, a head located on the end of said pipe, a movable flange surrounding the head, a bowl, a bottom for the bowl, the underside of said bottom forming the cover for the space inclosed by said flange, a casing surrounding the bowl and spaced therefrom, said casing, bowl, bottom and flange being formed integral with each other, and the wall of the bowl being formed at an angle with relation to the casing, there being delivery apertures formed around through the upper portion of the bowl, drainage conduits leading from the bowl, a partition located below the bowl, a disk adapted to close the central aperture in said partition, a tube extending down from said disk and located around the supply pipe, a rib formed around in said tube, a spring surrounding the tube with one end thereof pressing on said rib and the other pressing on the under edge of said head, a cushion against which the face of said head is adapted to be pressed by said spring, and means whereby said head and cushion may be spaced apart, all substantially as shown and described.

In testimony whereof I have hereunto subscribed my name to this specification in the presence of two subscribing witnesses.

FREDERICK GRUMME.

Witnesses:
ROBERT W. RANDLE,
R. E. RANDLE.